United States Patent Office 3,082,229
Patented Mar. 19, 1963

3,082,229
BIMETALLIC SALTS OF ETHYLENE BIS DITHIOCARBAMIC ACID
Lawrence H. Nash, P.O. Box 596, Belle Glade, Fla.
No Drawing. Filed Sept. 24, 1959, Ser. No. 841,930
4 Claims. (Cl. 260—429)

This invention relates to a new and improved fungicide, insecticide, microbicide and bactericide, used singularly or as an admixture with an inert carrier.

The object of this invention is to provide a new and improved fungicidal, bacterial, microbial and insecticidal composition that is non-toxic to either human, animal or plant life when used as directed herein and whose composition can be used as a liquid, powder or suspension.

Another object of this invention is to inhibit and prevent attacks of fungus on fruits, vegetables, wood, fabric, leather, paint, water treatment or organic materials. These objects are accomplished by my invention when used as a liquid, powder or suspension form.

The products produced are essentially neutral and the compounds produced are true compounds. The compounds produced by my invention are produced by one mole of an alkali sulphide, carbon sulphide and one mole of an alkylene amine, the number of moles of carbon sulphide being equal to the number of nitrogen atoms in the amine and one mole of an ionic metallic salt for each two moles of alkali sulphides used, the reaction taking place in a closed vessel.

In the following disclosures, the term thiocarbamate refers to dithiocarbamate. The term sulphur compound refers to carbon disulphide. The term metallic salt refers to water soluble metallic salts that have a valence of more than one. The valence of the alkali metal will have a valence of one unless otherwise noted.

My invention discloses the formation of essentially neutral thiocarbamates by the reaction of water soluble amines, alkali sulphides and carbon sulphides, when reacted by an exchange cation method using ionic metallic salts, forming alkali alkylene dithiocarbamate, a metallic alkylene dithiocarbamate as well as dithiocarbamates derived from the aromatic group of amines. The number of moles of carbon sulphides used for each mole of amine is equal to the number of nitrogen atoms in the molecule of the amine.

The aliphatic nitrogen compounds that can be processed into my invention are water soluble aliphatic nitrogen mono, di, tri, tetra and pentamines.

In the following examples, the sodium alkylene thiocarbamates are stressed. The cation of this compound can be changed by changing the cation exchange compound used in the process from sodium to either potassium, calcium or ammonium. Some of the compounds that will react with an alkali sulphide are the nitrates, pyrophosphates, phosphates, sulphates, chlorides, chlorites, chlorates, propionates, carbonates and acetates of sodium, potassium, calcium, and ammonium, for example ionic metallic salts such as sodium pyrophosphate, which is preferred.

The metals which can be processed into my invention are manganese, zinc, copper, iron, aluminum, calcium, cadmium and magnesium with anions of sulphates, chlorides, propionate, carbonate, and nitrates.

Some of the metallic sulphides that can be processed into my invention are calcium polysulphide, lithium, potassium, sodium, ammonium, cesium and barium.

The general formula of compounds of my invention is:

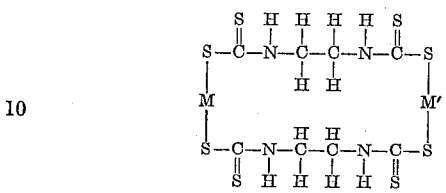

where X and X' are different members of alkali metals chosen from the group consisting of sodium, ammonium, potassium and lithium. When this compound is reacted with metallic salts a compound is formed of the general formula:

$$\begin{array}{c} S\ H\ H\ H\ H\ S \\ \| \ |\ \ |\ \ |\ \ |\ \ \| \\ S-C-N-C-C-N-C-S \\ |\ \ \ \ \ \ \ \ \ H\ H\ \ \ \ \ \ \ \ | \\ M\ \ \ \ \ \ \ \ \ \ \ \ \ \ \ \ \ \ \ \ \ \ \ \ \ M' \\ |\ \ \ \ \ \ \ \ \ H\ H\ \ \ \ \ \ \ \ | \\ S-C-N-C-C-N-C-S \\ \| \ |\ \ |\ \ |\ \ |\ \ \| \\ S\ H\ H\ H\ H\ S \end{array}$$

where M and M' are different metals having a valence of two, and chosen from copper, iron, manganese and zinc.

The products of my invention are compatible with the usual insecticides, plant nutriments, sticking and wetting agents, silicones, copper compounds, and compounds recommended by the U.S. Department of Agriculture for aiding agricultural fungicides to adhere to plant tissue.

When thiocarbamates are processed according to my invention, essentially neutral solutions are formed. The following examples show the ease and purity of the compound reacted. The following examples will also show that doubling the amount of amine and sulphur compound produces two moles of the reacted compound but with a higher pH. The following examples will also show the novel and new disclosure of forming a powdered thiocarbamate from the alkali salt without the use of a metallic salt.

The following examples will also show the formation of metallic thiocarbamates by spraying the alkali thiocarbamate upon an anhydrous metallic salt in a mixing vessel and then made free flowing by passing through a high speed grinder. The following examples will also show the addition of insecticides, plant nutriments, copper compound, sticking and wetting agents as well as water conditioners as additives to my invention.

By citing the following examples it is not the intention of limiting this invention solely to the examples as they show only the flexibility of the invention. The examples will show the formation of thiocarbamates formed from mono, di, tri, tetra and pentamines as well as from aromatic amines and mixed alkali and metallic thiocarbamates.

*Example 1.*—Shows the formation of a dithiocarbamate using a mono-amine, carbon disulphide and the exchange cation method:

4 moles ethylamine, or dimethylamine
2 moles ammonium sulphide
1 mole tetrasodium pyrophosphate
4 moles carbon disulphide
100 moles water These are reacted in a closed container for two hours forming four moles of sodium ethyl dithiocarbamate, one mole of tetrammonium pyrophosphate and two moles of hydrogen sulphide. Sodium ethyl dithiocarbamate is: $CH_3-CH_2-NH-CS-S-Na$ and is formed according to the following probable equation:

$$4C_2H_5NH_2 + 2(NH_4)_2S + Na_4P_2O_7 + 4CS_2 \longrightarrow$$

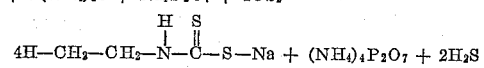

In reacting such compounds, whenever the resultant reaction forms a mole of sodium sulphide, this can be overcome by doubling the amine and carbon disulphide forming two moles of hydrogen sulphide instead of only one mole.

*Example 2.*—The formation of a dithiocarbamate using a diamine, carbon disulphide and the exchange cation method.

1 mole tetrasodium pyrophosphate
2 moles carbon disulphide
2 moles ammonium sulphide
1 mole tetrasodium pyrophosphate
100 moles water These are reacted in a closed vessel for two hours forming one mole of disodium ethylene bis dithiocarbamate, one mole of tetrammonium pyrophosphate, one mole of sodium sulphide and one mole of hydrogen sulphide. Disodium ethylene bis dithiocarbamate is:

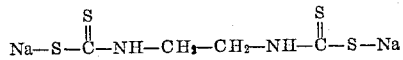

It is formed according to the following probable equation:

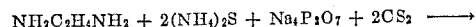
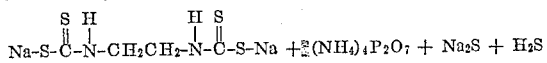

*Example 3.*—The thiocarbamates described in the preceeding examples were further processed into dry, free flowing powders by impregnating (spraying the liquid thiocarbamates under pressure) upon an inert diluent while said diluent is being mixed in a suitable mixer. Small balls containing the diluent and concentrated liquid formed to a small degree. These were corrected by passing the impregnated powder through a high speed grinder which made the powder free flowing. In the event an extremely fine dry (anhydrous) powder is desired, the impregnated powder can be put through a drying oven after the material has passed through the high speed grinder. This is unnecessary if an absorbent diluent is used. A thirty percent active ingredient dry powder should be the minimum concentrate.

*Example 4.*—The thiocarbamates described in the preceding examples were further processed into metallic thiocarbamates by spraying the individual thiocarbamates upon an anhydrous metallic salt or mixture of salts while said salt is being mixed in a suitable mixer. An atom of the metal is used for each sulphur atom in the compound being reacted. Heat is evolved and an outlet is necessary on the mixing equipment. The most important of the compounds formed are:

Zinc manganous ethylene bis dithiocarbamate

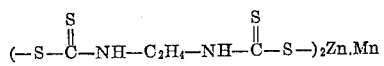

or more generally represented by the following:

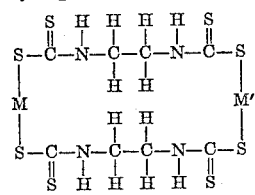

M and M' are metals of water soluble salts whose valence is two, are separate and distinct, chosen from zinc, iron, copper and manganese.

*Example 5.*—The thiacarbamates processed in the preceding example were also processed by dissolving the water soluble metallic salt in water, reacting to precipitate the water insoluble metallic thiocarbamate which is filtered and dried in a forced draft oven at 25° C. and then passed through a high speed grinder to make same a free flowing powder. Mixed metallic salts can be processed. This reaction produces a purer thiocarbamate than the preceding example but it does not produce as efficient a product as will be shown hereinafter. In a number of reactions only half the required amount of metallic salt was put into solution and reacted with the full amount of thiocarbamate. The filtrate was saved and further reacted with the balance of the required amount of water soluble metallic salt. The filtered precipitate of the first precipitation decomposed rapidly, while the filtered precipitate of the second precipitation did not. The filtrate of the second precipitation was clear and test showed the material had been completely reacted. An atom of metal for each atom of sulphur in the compound reacted. In processing these water soluble metallic salts, it was found that metallic chlorides caused the filtrate to become acid and the use of ammonium hydroxide was necessary to return the solution to neutral. Sulphates and nitrates do not cause a change in alkalinity of the filtrate.

*Example 6.*—The neutral alkali alkylene thicarbamates were sprayed upon green bush beans for control of bean rust. None of the neutral thiocarbamates cause injury at two quarts alkali alkylene thiocarbamate to 100 gallons of water, which were sprayed upon one acre of beans. Excellent control of rust was secured. Sodium ammonium ethylene bis dithiocarbamate gave the best control. Zinc manganous ethylene bis dithiocarbamate, using four pounds of concentrate to 50 gallons of water, gave extremely good result in rust control and where plants were chlorotic (yellow), the plants returned to a green lustre in five days. Zinc manganous ethylene bis dithiocarbamate as compounded in Example 5, using four pounds of concentrate to 100 gallons of water, gave good control of rust but did not give the plant the stimulation that the anhydrous salt produced. The yield of beans was 40% higher where the anhydrous salt was used.

*Example 7.*—The dry powder as compound in Example 3 was used at the rate of nine pounds of a 15% sodium ammonium ethylene bis dithiocarbamate plus one pound 36% metallic zinc sulphate to 50 gallons of water plus four ounces of sorbitan palmitate as a sticking and wetting agent for application on cabbage for control of downy mildew. When sprayed at 100 gallons per acre on a weekly interval gives good results of the disease. When manganese sulphate is used as an additive at eight pounds per 100 gallons of finished spray, the cabbage becomes much greener and glossier. DDT and chlorinated camphene were added to the spray when worms threatened at the recommended doseages, of three pounds of wettable powder to 100 gallons of water.

*Example 8.*—The mixed salts of alkylene thiocarbamate is shown by the following example.

1 mole ethylenediamine
2 moles carbon disulphide
½ mole ammonium sulphide
½ mole sodium sulphide
40 moles water These are reacted in a closed vessel for two hours, forming a clear amber colored fluid, sodium ammonium ethylene bis dithiocarbamate and one mole of hydrogen sulphide. Sodium ammonium ethylene bis dithiocarbamate is:

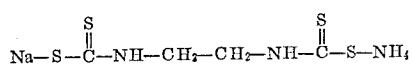

Glues, soap, water conditioners and other additives may be added after the reaction. In field trials by an independent pathologist, this compound showed good promise as an agricultural fungicide. It is now in a large agricultural college being investigated in the field. Another compound of this example is, sodium potassium ethylene bis dithiocarbamate:

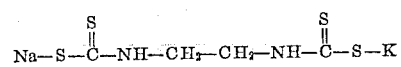

*Example 9.*—The procedure as outlined in Examples 3, 4 and 5 were followed in processing mixed salts of alkylene thiocarbamate. Some of the salts formed were:

Zinc manganous ethylene bis dithiocarbamate

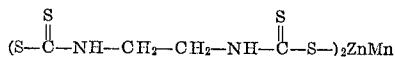

Cupric ferrous ethylene bis trithiocarbamate

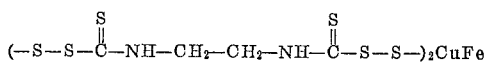

The metals shown in this example are from the nitrate or sulphate of the metal. The use of chlorides causes an increase in acidity.

I claim:
1. The mixed alkali ethylene bis dithiocarbamates having the general structure:

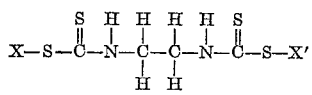

where X and X' are different members of alkali metals chosen from the group consisting of sodium, ammonium, potassium and lithium.

2. The mixed metallic salts of dimetallic ethylene bis dithiocarbamate having the general structure:

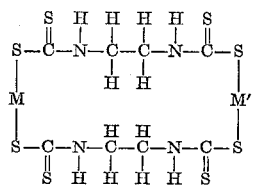

where M and M' are different metals having a valence of two, and chosen from copper, iron, manganese and zinc.

3. Sodium ammonium ethylene bis dithiocarbamate having the following structural formula

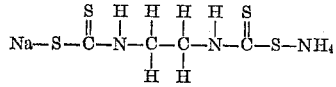

4. Zinc manganous ethylene bis dithiocarbamate having the following structural formula

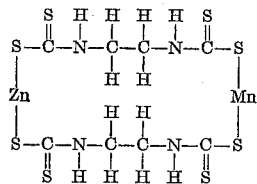

References Cited in the file of this patent
UNITED STATES PATENTS

| | | |
|---|---|---|
| 2,390,713 | Hunt | Dec. 11, 1945 |
| 2,406,960 | Neal et al. | Sept. 3, 1946 |
| 2,855,418 | Mugnier | Oct. 7, 1958 |
| 2,859,246 | Martin et al. | Nov. 4, 1958 |
| 2,927,936 | Harvey | Mar. 8, 1960 |

FOREIGN PATENTS

| | | |
|---|---|---|
| 460,389 | Great Britain | Jan. 27, 1937 |
| 190,523 | Austria | July 10, 1957 |